US007674432B2

(12) United States Patent
Wilmer

(10) Patent No.: US 7,674,432 B2
(45) Date of Patent: Mar. 9, 2010

(54) PIPETTING DEVICE

(75) Inventor: Jens Wilmer, Ahrensburg (DE)

(73) Assignee: Eppendorf AG, Hamburg (DE)

( * ) Notice: Subject to any disclaimer, the term of this patent is extended or adjusted under 35 U.S.C. 154(b) by 535 days.

(21) Appl. No.: 11/508,084

(22) Filed: Aug. 22, 2006

(65) Prior Publication Data

US 2007/0048193 A1 Mar. 1, 2007

(30) Foreign Application Priority Data

Aug. 31, 2005 (DE) ....................... 10 2005 041 183

(51) Int. Cl.
*G01N 1/14* (2006.01)
*B01L 3/02* (2006.01)

(52) U.S. Cl. .................................... 422/100; 73/864.14

(58) Field of Classification Search ................. 422/100; 73/864.14

See application file for complete search history.

(56) References Cited

U.S. PATENT DOCUMENTS

| | | | | |
|---|---|---|---|---|
| 4,474,071 | A | 10/1984 | Marteau d'Autry | |
| 4,616,514 | A | 10/1986 | Magnussen, Jr. et al. | 73/864.14 |
| 4,784,834 | A * | 11/1988 | Hirschmann | 422/100 |
| 6,874,379 | B2 * | 4/2005 | Matsuda et al. | 73/864.14 |

FOREIGN PATENT DOCUMENTS

| | | | |
|---|---|---|---|
| DE | 197 08 151 | A1 | 10/1998 |
| EP | 0 428 500 | B1 | 2/1985 |
| EP | 0 421 785 | A2 | 10/1991 |
| GB | 2 161 398 | A | 1/1986 |
| WO | 91/05609 | A1 | 5/1991 |
| WO | 01/76749 | A1 | 10/2001 |

* cited by examiner

*Primary Examiner*—Jill Warden
*Assistant Examiner*—Cedric Chan
(74) *Attorney, Agent, or Firm*—Vidas, Arrett & Steinkraus, P.A.

(57) ABSTRACT

Pipetting device with an upper part of the casing, a driving element, arranged in the upper part of the casing, with a movable drive element, a spigot receiver, arranged in the upper part of the casing, at least one claw receiver inside the spigot receiver, a lower part of the casing, at least one displacement equipment, arranged in the lower part of the casing, with a displacement chamber, at least one seat for detachably holding a pipette point, arranged on the lower part of the casing and being connected with the displacement chamber via a channel, a spigot, arranged on the lower part of the casing, to be inserted into the spigot receiver, at least one snap hook, arranged on the spigot, with a claw for engaging into the claw receiver when the spigot is inserted into the spigot receiver, and a springy shaft, which is deflectable transversely to the axis of the spigot in order to lift off the claw out of the claw receiver, a lock release ring, movable on the spigot, a wedge gear on the shaft and the lock release ring, effecting deflection of the snap hook towards the axis upon displacement of the lock release ring in a certain direction, and away from the axis upon displacement of the lock release ring in the direction opposite thereto, and a coupling equipment for coupling the drive element and the displacement equipment when the spigot is inserted into the spigot receiver.

15 Claims, 8 Drawing Sheets

PIPETTING DEVICE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a pipetting device with an upper part of the casing and a lower part of the casing, detachably connectable with the upper part of the casing, which has at least one seat for detachably holding a pipette point.

Pipetting devices are used in the laboratory, in particular, for the dosing of liquids. These are picked up and discharged in pipette points via a tip opening. In air cushion pipettes, a displacement equipment for a gas is integrated into the pipetting device and communicatingly connected with the pipette point through a hole in the seat. An air cushion is displaced by means of the displacement equipment, so that liquid is aspirated into the pipette point and ejected from it. Mostly, the displacement equipment is a cylinder with a plunger movable therein.

The pipette point is detachably held in its seat, so that it can be replaced by a new pipette point after use. Through this, carryovers and contaminations can be avoided at subsequent dosings. Pipette points for one time use are available from plastics at a reasonable price.

In air cushion pipettes, contamination of the displacement equipment, and of the lower part of the pipette casing in particular, can take place. Therefore, it is desirable to realise the pipette casing in two parts with a lower part of the casing and an upper part of the casing, which are separable from each other for the purpose of autoclaving, for instance. Further, it may be desirable to replace lower parts of the casing by displacement equipments, in order to use the pipetting device at different volume ranges. Finally, a one channel pipette can be transformed into a multi-channel pipette, or the number of channels of a multi-channel pipette can be changed.

From EP 0 428 500 B1, the entire contents of which is hereby incorporated by reference in its entirety, a pipetting device with a displacement equipment in a lower part of the casing is already known, which is screwable on the shaft of an upper part of the casing with a drive equipment for the displacement equipment via an union nut. However, the exchange of the lower part of the casing is arduous, time-consuming and troublesome. For the use of threads, the assembly is lavish. In addition, unintentional separation of the lower part of the casing from the upper part of the casing can easily occur due to the thread connection.

From GB 2 1616 398 A, the entire contents of which is hereby incorporated by reference in its entirety, a pipette with a snap connection between the lower part of the casing and the upper part of the casing is know. The lower part of the casing is connected with the upper part of the casing via a coupling, which has hook-shaped flanges which snap into the receivers of the upper part of the casing. Unlocking the parts of the snap connection from each other is difficult when the snap connection is dimensioned such that the lower part of the casing and the upper part of the casing are connected with each other with sufficient security. When the strength of the snap connection is reduced, there is a danger that the lower part of the casing and the upper part of the casing are unintentionally separated from each other when used.

Departing from this, the present invention is based on the objective to provide a pipetting device in which the upper part of the casing and the lower part of the casing can be easily separated from each other and can be connected with each other with great security in spite of this.

BRIEF SUMMARY OF THE INVENTION

The pipetting device according to the invention has an upper part of the casing, a drive equipment, arranged in the upper part of the casing, with a movable drive element, a spigot receiver, arranged in the upper part of the casing, at least one claw receiver inside the spigot receiver, a lower part of the casing, at least one displacement equipment, arranged in the lower part of the casing, with a displacement chamber, at least one seat for detachably holding a pipette point, arranged on the lower part of the casing and being connected with the displacement chamber via a channel, a spigot, arranged on the lower part of the casing, to be inserted into the spigot receiver, at least one snap hook, arranged on the spigot, with a claw for engaging into the claw receiver when the spigot is inserted into the spigot receiver, and a springy shaft, which is deflectable transversely to the axis of the spigot in order to lift off the claw out of the claw receiver, a lock release ring, movable on the spigot, a wedge gear on the shaft and the lock release ring, effecting deflection of the snap hook towards the axis upon displacement of the lock release ring in a certain direction, and away from the axis upon displacement of the lock release ring in the direction opposite thereto, and a coupling equipment for coupling the drive element and the displacement equipment when the spigot is inserted into the spigot receiver.

The pipetting device according to the present invention has a snapping connection between the upper part of the casing and the lower part of the casing. It is possible to realise this snapping connection in a particularly solid manner so that the upper part of the casing and the lower part of the casing are safely connected with each other. Dismounting is easily possible, however, because the snapping connection can be released in a simple manner and with reduced effort by displacing the lock release ring. Namely, the force for the deflection of the snap hook is significantly reduced because of the wedge gear which is formed on the shaft and on the lock release ring. Thus, it is possible with a relatively small effort to displace the lock release ring against the considerable spring force of the snap hook. As a consequence, the snap hook can be realised in a particularly rigid manner or engage into the claw receiver with its claw under pre-tension, respectively. The present invention is also advantageous when several snap hooks are provided, which have to be deflected simultaneously with increased force for dismounting.

The present invention incorporates different embodiments of the displacement equipment. For instance, it may be dealt in this with a displacement chamber with a movable wall, realised as a membrane. Preferably, the displacement equipment is a cylinder in which a plunger is movable. The present invention incorporates realisations in which plunger and cylinder are arranged in the lower part of the casing, as well as realisations in which only the cylinder is arranged in the lower part of the casing and the plunger is assigned to the upper part of the casing and is inserted into the cylinder when the lower part of the casing and the upper part of the casing are connected.

For accurate dosing, a defined fit of the lower part of the casing in the upper part of the casing is required. According to one embodiment, a pressure spring equipment of the spigot receiver is assigned to the upper part of the casing for this, which presses against the spigot in a direction opposite to the insertion direction of the spigot, which is inserted into the spigot receiver. By doing so, it is achieved that the spigot takes a defined position in the spigot receiver with its claw, so that the upper part of the casing and the lower part of the casing occupy a defined position with respect to each other. In addition, dismounting is facilitated, because as soon as the claw is lifted out from the claw receiver, the pressure spring equipment presses the upper part of the casing and the lower part of the casing against each other. As a consequence, the user can concentrate himself on the actuation of the lock release ring, because when the lock is released, upper part of the casing and lower part of the casing automatically move away from each other.

According to one embodiment, the spigot has a sleeve portion, positioned before the snap hook in the insertion direction, and at least one connection bridge arranged alongside the snap hook, snap hook and connection bridge are connected with a base portion, and sleeve portion, connection bridge and snap hook form a hollow cylindrically spigot, from which the claw projects somewhat towards the outside when the spigot is not inserted into the spigot receiver. The sleeve portion, positioned ahead in the insertion direction, and the cylindrical shape facilitate the insertion of the spigot into the spigot receiver. The outside projecting claw can snap in upon insertion into the claw receiver. The displacement equipment can be coupled with the drive element of the drive equipment via an opening in the hollow cylinder at the front side thereof. For instance, the base part is fixedly connected with a seat for the pipette point, which is realised as a conical or cylindrical lug, for instance.

For instance, the snap hook receiver is realised as a pocket on the inside perimeter of the spigot receiver with a limited extension in the perimeter direction. According to one embodiment, it is a ring groove circulating at the inside perimeter of the spigot receiver, so that the lower part of the casing is insertable into the spigot receiver in any arbitrary turning position with respect to it, or upper part of the casing and lower part of the casing are swingable with respect to each other in the locked condition, respectively.

According to one embodiment, the spigot has a connection element, arranged before the snap hook in the insertion direction, which presses against the pressure spring equipment when the spigot is inserted into the spigot receiver. This favours a gradual build-up of a spring tension of suitable extent until the claw enters the claw receiver, and with this the defined position of the upper part of the casing with respect to the lower part of the casing, as well as the automatic separation thereof in the case of unlocking.

In principle, the snap hook can be directed diagonally to the axis of the spigot in its deflected condition. According to one embodiment, the snap hook is oriented essentially parallel to the axis of the spigot in the not deflected state. This makes possible an essentially cylindrical realisation of the spigot, which facilitates insertion in arbitrary angle positions of the upper part of the casing and the lower part of the casing with respect to the spigot axis.

According to one embodiment, the pipetting device has only one snap hook. According to another embodiment, the pipetting device has several snap hooks, which are distributed symmetrically around the perimeter of the spigot. Through this, a particularly safe fastening of the lower part of the casing on the upper part of the casing is achieved. In addition, the fastening forces acting uniformly upon the spigot favour a defined position of the upper part of the casing and the lower part of the casing and facilitate mounting and dismounting.

According to one embodiment which facilitates the connection of the upper part of the casing and the lower part of the casing, the claw has a feather edge at that end which precedes when inserting into the spigot receiver, and/or the spigot receiver has an enlargement directed towards the outside.

The invention includes different realisations of the wedge gear on shaft and locking ring. According to one embodiment, the wedge gear has a projection on the shaft, projecting towards the outside, and a wedge plane on the projection and/or a wedge plane on the inside perimeter of the locking ring. Thus, a projection with a wedge plane is included, over which the locking rings slips with its inside perimeter, which is realised without wedge planes. In addition, a projection without wedge plane is included, over which slips a wedge plane on the inside perimeter of the locking ring. Further, projection and inside perimeter can be realised each one with a wedge plane, which slip over each other.

According to one embodiment, the wedge plane is directed into the direction of the spigot and the lock release ring is axially movable on the spigot. Thus, deflection of the snap hook is effected by axial displacement of the lock release ring.

According to one embodiment, the spigot has axial stops, between which the lock release ring is movable. By the stops, the lock release ring is captively connected with the spigot. In addition, the stops limit the displacement range of the lock release ring.

According to one embodiment, the wedge plane is directed in the perimeter direction of the spigot and the lock release ring has at least one receiver, into which the projection on the shaft of the snap hook is turnable in. In this embodiment, the snap hook is deflected by turning the lock release ring, because by doing so the projection slips out of the receiver to the inside perimeter of the lock release ring. For this purpose, the extension of the receiver is limited in the perimeter direction of the look release ring. For instance, it is somewhat greater than the extension of the projection in the perimeter direction, so that the same can be easily turned out. For locking, the projection has to be turned into the receiver. Even in this embodiment, axial stops can be present which keep the lock release ring at ready in a position on the spigot in which the projection of the snap hook can enter the receiver of the locking ring.

According to one embodiment, the shaft has a stop, projecting towards the outside, and the lock release ring has a receiver groove for the stop, which has a limited extension in the perimeter direction of the lock release ring, which permits turning the lock release ring from that turning position in which the projection engages into the receiver into a turning position in which the projection sits closely on the inside perimeter of the lock release ring besides the receiver. The stop limits the turning range of the locking ring, so that the same can deflect the snap hook from the engaging position in the claw receiver into a not engaging position. Further, the receiver groove can prevent axial displacement of the lock release ring on the spigot, so that the projection can always be turned into the receiver in a simple manner.

In one-channel pipettes, displacement of the lock release ring by hand is easily possible. In multi-channel pipettes, the displacement of the lock release ring by hand is obstructed by the lateral outreach of the lower part of the casing. For multi-channel pipettes in particular, according to one embodiment the lock release ring has an axially directed toothing on its perimeter, and the upper part of the casing has a discarding equipment, which has an additional toothing on an element which is axially movable with respect to the spigot receiver, which is out of engagement with the toothing when the discarding equipment is not actuated, and which can be brought into engagement with the toothing by actuation of the discarding equipment. When the toothings are brought into engagement by actuation of the discarding equipment, the lock release ring is prevented from any rotation. As a consequence, by turning the lower part of the casing it is possible to turn the projection of the snap hook out from the receiver of the fixed lock release ring and to lift out the snap hook with its claw from the claw receiver. Turning the outreaching lower part of the casing is easily possible. In addition, this embodiment secures the pipetting device against unintentional separation of the upper part of the casing and the lower part of the casing, because separation is only possible when the discarding equipment is actuated. Due to this in particular, this embodiment is also advantageous in one-channel pipettes. Particularly advantageous is the use of an already existing discarding equipment for pipette points. The realisation of the pipetting device with a special discarding equipment for the positional fixation of the lock release ring, which is a discarding equipment for the lower part of the casing in this case, is also incorporated in the present invention, however.

According to a further embodiment, the axial toothing is arranged on the lower side of a discarding transmitter, which is connected—detachably or fixedly—with a discarding rod which is guided in the upper part of the casing, and which is connected—detachably or fixedly—with a discarder for pipette points which is guided on the lower part of the casing, a discarding sleeve or discarding plate, for instance.

According to one embodiment, the pipetting device is a one-channel pipette.

According to a further embodiment, the pipetting device is a multi-channel pipette. Pipetting devices which can be transformed from a one-channel pipette into a multi-channel pipette and vice versa by replacing the lower part of the casing are also incorporated.

BRIEF DESCRIPTION OF SEVERAL VIEWS OF THE DRAWINGS

The present invention is hereinafter explained in more detail by means of the attached drawings of realisation examples. In the drawings show.

DETAILED DESCRIPTION OF THE INVENTION

Figure 1:
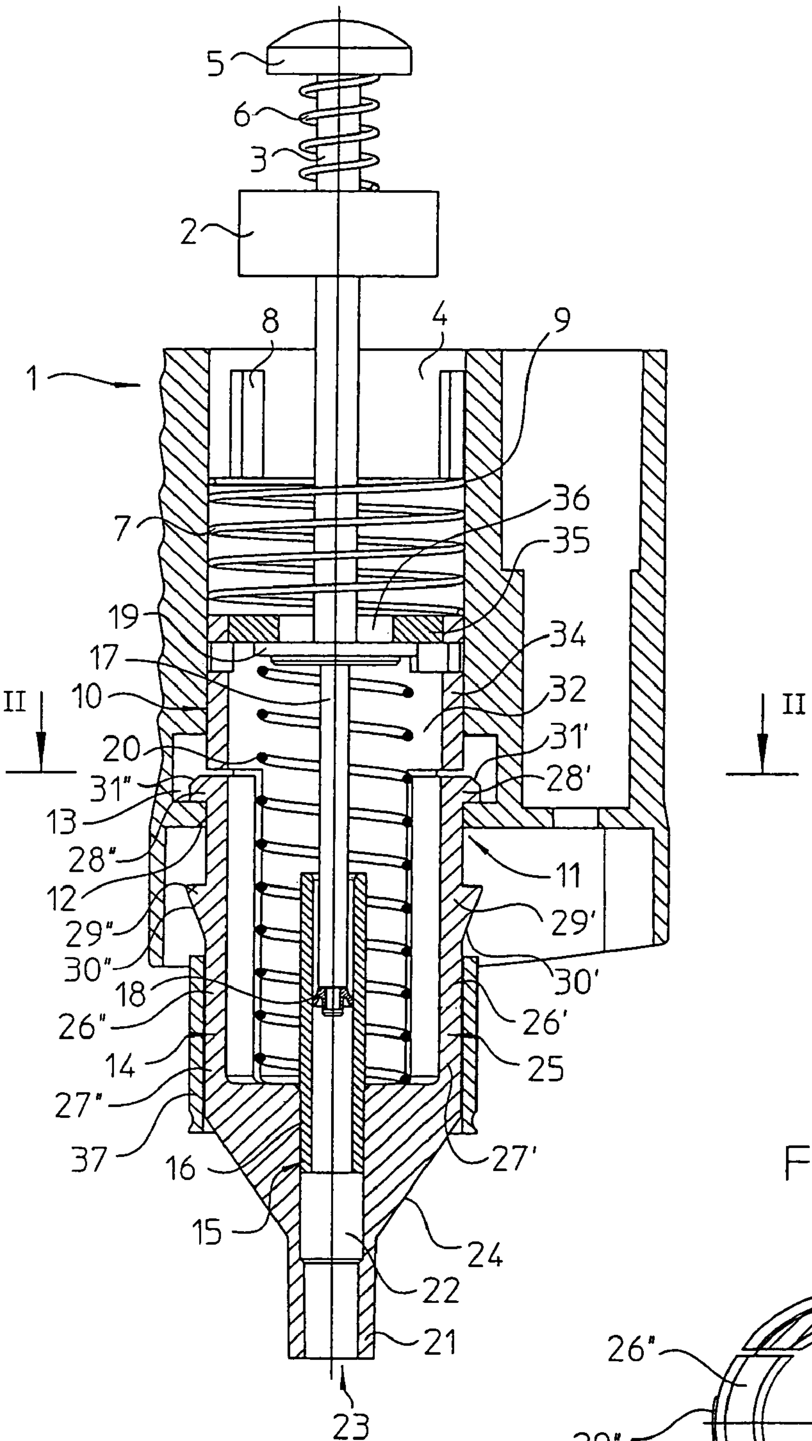
FIG. 1 upper part of the casing and upper part of the casing at locked spigot in a vertical partial section.
Figure 2:
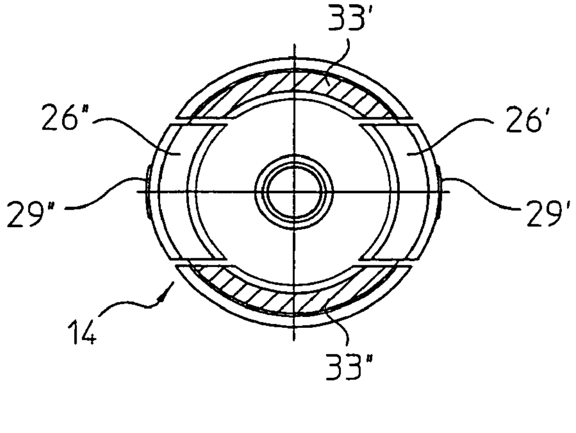
FIG. 2 lower part of the casing in a section along the line II-II of FIG. 1.
Figure 3:
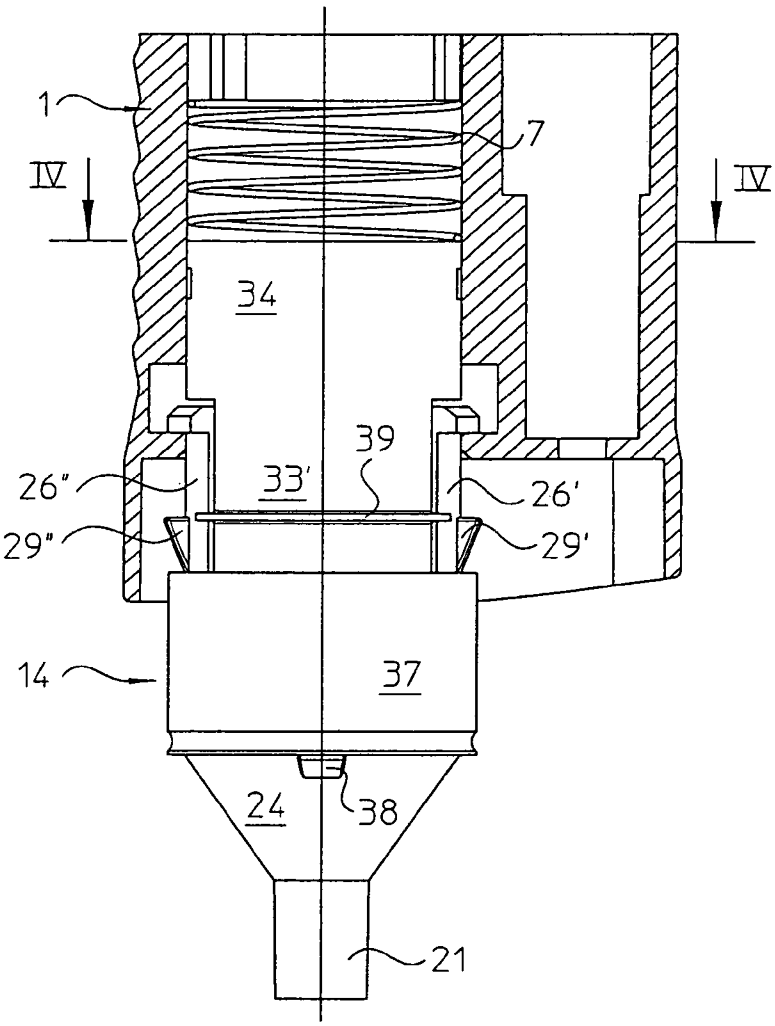
FIG. 3 upper part of the casing in a vertical partial section and lower part of the casing in full view at locked spigot.
Figure 4:
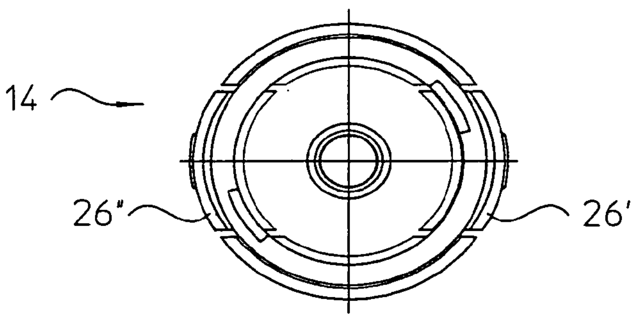
FIG. 4 lower part of the casing in a view along the line IV-IV of FIG. 3.
Figure 5:
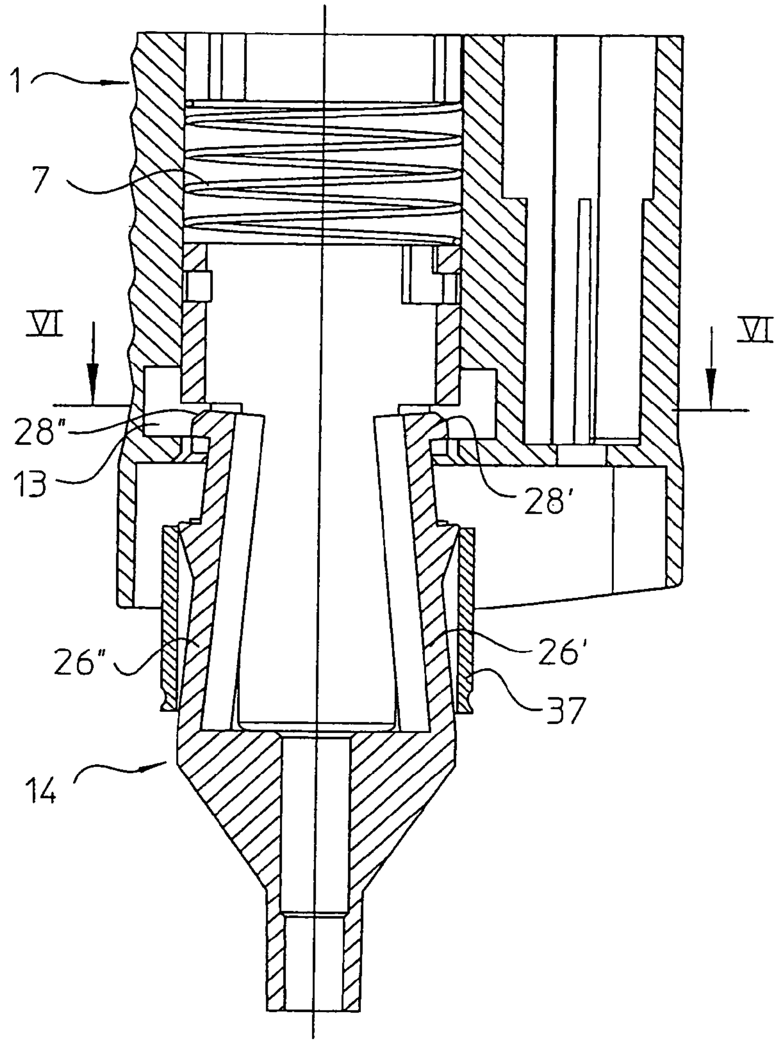
FIG. 5 upper part of the casing and lower part of the casing at the insertion and lock release of the spigot in a vertical partial section.
Figure 6:
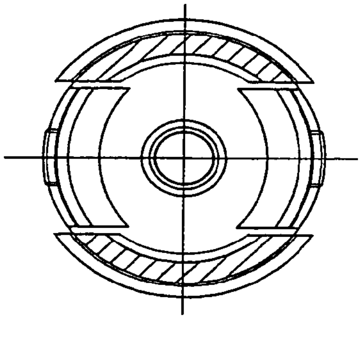
FIG. 6 lower part of the casing in a section along the line VI-VI of FIG. 5.

While this invention may be embodied in many different forms, there are described in detail herein a specific preferred embodiment of the invention. This description is an exemplification of the principles of the invention and is not intended to limit the invention to the particular embodiment illustrated In the following description, the indications top and bottom are related to the orientation of the pipetting device when pipetting, in which the pipetting device is held upright with the upper part of the casing at the top and the lower part of the casing and the pipette point fixed thereon at the bottom.

According to FIGS. 1 to 6, a one-channel pipetting device has an upper part of the casing 1 with a drive equipment 2, which has a movable drive element 3 in the form of a lifting rod, which extends in the axial direction of a cylindrical hollow chamber 4 in the upper part of the casing 1. The drive element 3 is axially movable in the direction of its longitudinal axis.

The drive equipment 2 has an actuation button 5, which can be actuated against a return spring 6. By pressing the actuation button 5, the drive element 3 is movable towards the bottom. After release of the actuation button 5, the drive element 3 is moved back into the shown initial position by the return spring 6.

In the realisation as a fixed volume pipette, only one defined stroke of the drive element 3 is possible. In the realisation as a pipette with adjustable dosing volume, the drive equipment 2 comprises equipments which enable adjustment of the stroke of the drive element 3 and display equipments, which indicate the respective dosing volume set.

In the hollow chamber 4, a pressure spring equipment 7, realised as a helical spring, is supported on upper ribs 8, which are arranged at the inside perimeter of the hollow chamber 4, and is held in the hollow chamber 4 by the clamping action of its upper coil 9.

The bottom part of the hollow chamber 4, which around up to the bottom end of the pressure spring equipment 7 or so, is a spigot receiver 10. The spigot receiver 10 is accessible on the bottom side via a casing opening 11. The casing opening 11 has a conical enlargement 12. Somewhat above the casing opening 11, a claw receiver 13 exists in the spigot receiver 10, which is realised as a ring groove, circulating on the inside perimeter of the spigot receiver 10.

The upper part of the casing 1 is made of a hard plastic material, for instance. Components which are set into the upper part of the casing, like the drive equipment 2 and the springs 6, 7, for instance, are made partly or completely of metal and/or plastics.

In addition, the pipetting device has a lower part of the casing 14. The lower part of the casing comprises a displacement system 15, which is realised as a cylinder 16 with a plunger 17, axially movable therein. Between plunger 17 and cylinder 16, there is a sealing system 18. The plunger 17 has a plunger pan 19 at the top. Between plunger pan 19 and the upper side of the cylinder 16, there is a plunger return spring 20. One of the two springs 6 or 20 can also be omitted.

On its bottom side, the lower part of the casing 14 has a cylindrical or slightly conical, respectively, lug 21 for clamping on a pipette point. The cylinder 16 is connected with a central opening 23 in the lug via a channel 22.

The displacement equipment 15 is made partly or completely of metal and/or plastics.

Above the lug 21, the lower part of the casing 14 has a cone region 24. Lug 21 and cone region 24 form one base part together. Above it, the lower part of the casing 14 is realised as an essentially cylindrical spigot 25. The spigot 25 has two snap hooks 26', 26", diametrically facing each other, which have each one a shaft 27', 27" on the bottom side, connected with the cone region 24, and a claw 28', 28" projecting towards the outside on the upper end. About in the middle of each shaft 27', 27" there is a projection 29', 29", projecting towards the outside, which is wedge-shaped or has a wedge plane 30, 30" on the outside, respectively. The wedge planes 30', 30' are directed into the direction of the axis of the spigot 25, the height of the projections 29', 29" with respect to the shafts 27', 27" increasing from bottom to top in this.

At the top, the claws 28', 28" have a conical feather edge 31.

The snap hooks 26', 26" are aligned about parallel to the axis of the spigot 25 in the undeflected condition (compare FIG. 1). They are elastically deflectable towards the axis of the spigot 25. For this purpose, the cone region 24 and the lug 21 of the lower part of the casing 14, which are integrally manufactured with it, are made from an elastic but hard plastic material.

In addition, the spigot 25 has a connection element 32, which has two connection bridges 33', 33", diametrically opposing each other. The connection bridges 33', 33" are arranged in parallel to the axis of the spigot 25. Above the snap hooks 26', 26", they are connected with each other by a completely circulating, hollow cylindrical sleeve portion 34. At the topside, the sleeve portion 34 has a flange 35, projecting towards the inside, with a central hole 36, through which the drive element 3 is insertable. The plunger return spring 20 pushes the pan 19 against the flange 35, and the plungers 17 towards the upside in doing so.

The connection bridges 33', 33" and the shafts 27', 27" of the snap hooks 26', 26" are also hollow cylindrical. In the undeflected condition, the shafts 27', 27" complement the connection hooks 33 to a hollow cylindrical body or so, which is itself complemented by the hollow cylindrical sleeve portion 34 at the topside. As a result, a hollow cylindrical spigot 25 is formed altogether by the elements described above.

A hollow cylindrical lock release ring 37 sits axially movable on the spigot 25. The inside diameter of the lock release ring 37 exceeds the outer diameter of the spigot 25 below the projections 29', 29" in a slight extent. The lock release ring 37 is axially movable between a lower axial stop 38 and an upper axial stop 39 (compare FIG. 3). The lower axial stop 38 is formed by two projections, which project towards the outside on the topside of the cone region 24 and face each other diametrically. The upper axial stop 39 is formed by projections 39 on the connection bridges 33', 33", projecting towards the outside.

The stop 38 is positioned such that the lock release ring 37 is movable from a position where it exposes the projections 29', 29" into a position in which it covers the projections 29', 29". The inside diameter of the lock release ring 37 is dimensioned such that it slips over the sliding planes 30', 30" with its inside perimeter and deflects the snap hooks 26', 26" towards the axis of the spigot 25 when it is thrusted on the projections 29', 29".

The upper part of the casing 1 and the lower part of the casing 14 are handled as follows:

For mounting, the lower part of the casing 14 is axially inserted into the spigot receiver 10 with the spigot 25. By doing so, the feather edges 31, 31" slip over the enlargement 12 and the snap hooks 26', 26" are deflected towards the inside. The pressure spring equipment 7 is compressed somewhat by the connection element 32 of the spigot 25. The drive element 3 plunges into the hole 36 and contacts the pan 19. Finally, the claws 28', 28" snap into the claw receiver 13. The pressure spring equipment 7 pushes the claws 28', 28" against the claw receiver 13 with its bottom side, so that a defined position is maintained. The spring pan 19 is kept in a defined close fit to the drive element 3 by the plunger return spring 20 (compare FIG. 1).

Also, the mounting can take place such that first the lock release ring 39 is thrusted up to the upper stop 39, so that the snap hooks 26', 26" yield elastically towards the inside. When the claws 28', 28" are on the height of the claw receiver 13, the lock release ring 37 has to be thrusted towards the downside, so that the claws 28', 28" engage into the claw receiver.

After clamping up a pipette point on the lug 21, an air column can be moved by means of the displacement equipment 15 by actuating the actuation button 5, in order to aspirate or eject, respectively, liquid into/from the pipette point.

For dismounting, the lock release ring 37 is thrusted upward, so that the claws 28', 28" are lifted out from the claw receiver 13. This is reached when the lock release ring 37 sits closely to the upper stop 39. The pressure spring equipment 7 pushes the lower part of the casing 14 out of the upper part of the casing 1, so that it can be taken out easily (compare FIG. 5).

In the explanation of the realisation example of FIGS. 7 to 13, parts which are essentially coincident with those of the realisation example of FIGS. 1 to 6 are provided with the same reference numerals.

The upper part of the casing is realised in an identical manner. For this example of realisation, it is important that the upper part of the casing has an axially directed shaft 40 besides the hollow chamber 4, through which a discarding rod 41 is guided. On the upper end of the upper part of the casing 1, the discarding rod 41 is connected with a discarding button 42. A discarding spring 43 between casing and discarding rod 41 pushes the discarding rod 41 back into an upper initial position. At the bottom, the discarding rod 41 has a plug-in end 44, standing out from the upper part of the casing 1 at its bottom.

The lower part of the casing 45 has a spigot 25, which has—in difference to the spigot described above—projections 46', 46" with wedge planes 47', 47" on the snap hooks 26, 26", which are directed into the perimeter direction of the spigot. In addition, a stop 48', 48", projecting towards the outside, is present on the snap hooks 26', 26" below each projection 46', 46" at a time.

A lock release ring 25 sits on the spigot 25, which has two receivers 49', 49", diametrically facing each other, into which the projections 46', 46" can be turned in. The receivers 49', 49" extend in the perimeter direction about the whole length of the projections 46', 46". The receivers 49', 49" are realised as through holes of the lock release ring 37.

Below the receiver 49', 49", the lock release ring 37 has two receiver grooves 50', 50", diametrically facing each other, which are also realised as through holes. The stops 48', 48" can be placed into the receiver grooves 50', 50". The receiver grooves 50', 50" extend about a region of the perimeter of the spigot 25, so that the stops 48', 48" are movable inside the receiver grooves 50', 50". The axial extension of the receiver grooves 50', 50" exceeds somewhat the axial extension of the stops 48', 48", so that the lock release ring 37 is held unmovable in the axial direction on the spigot 25 when the stops 48', 48" engage into the ring grooves 50', 50".

Figure 7:
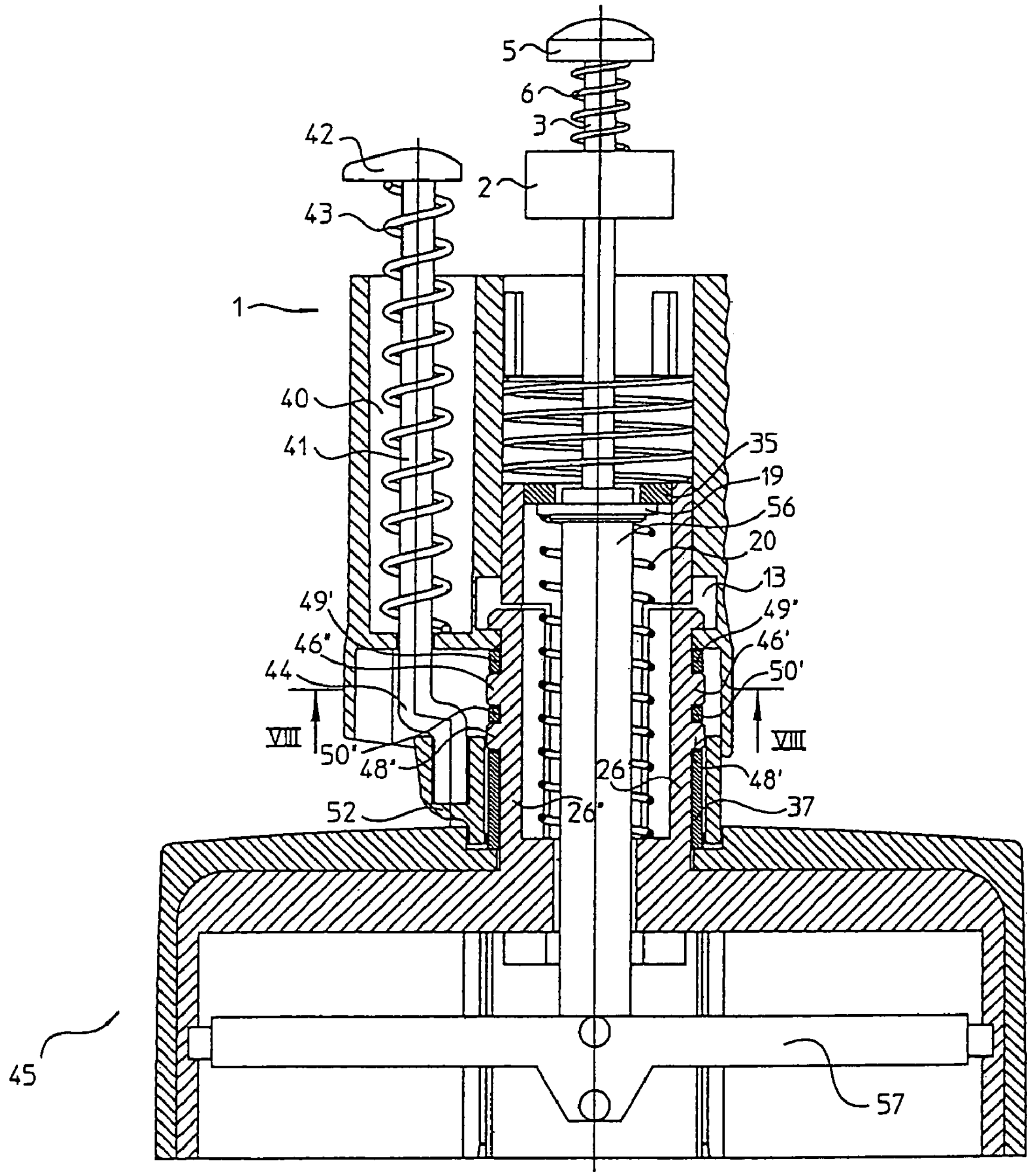
FIG. 7 upper part of the casing and lower part of the casing of a multi-channel pipetting device in the locked condition, in a vertical partial section.
Figure 8:
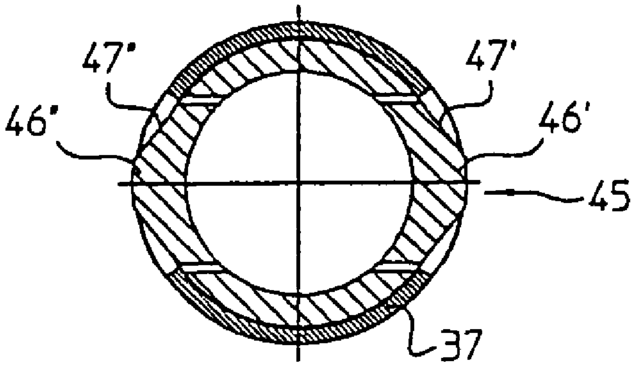
FIG. 8 lower part of the casing in a section along the line VIII-VIII of FIG. 7.
Figure 9:
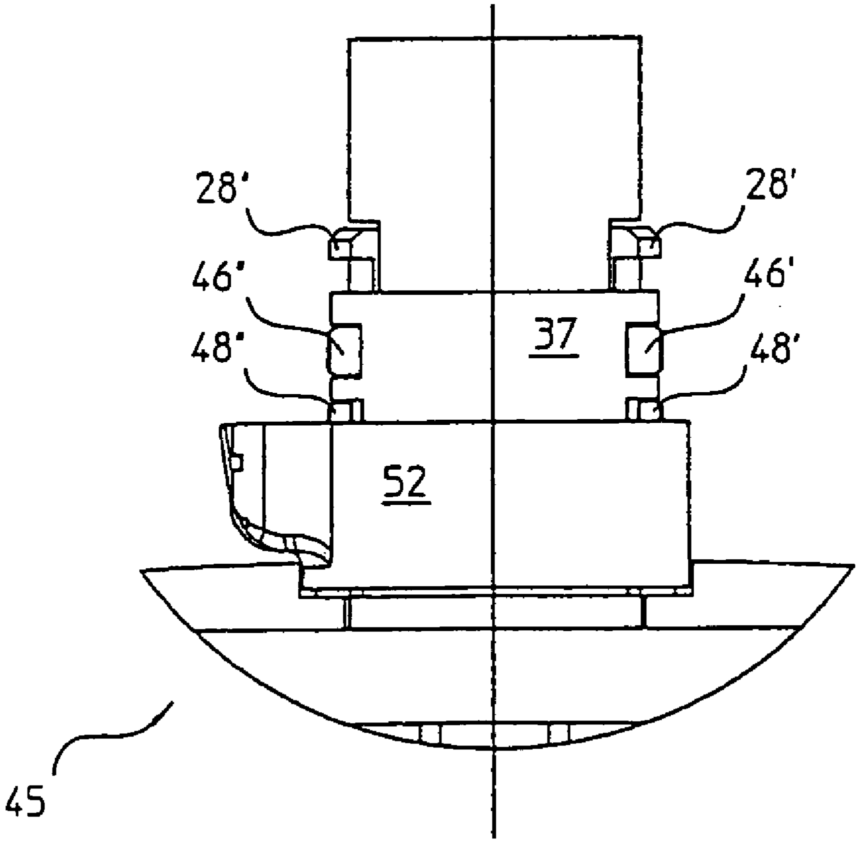
FIG. 9 lower part of the casing with discarding transmitter in the snapped position and locked locking hook in a full view.
Figure 11:
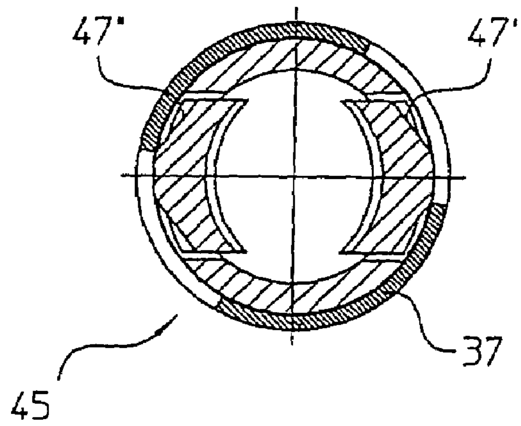
FIG. 11 lower part of the casing in a section along the line XI-XI of FIG. 10.
Figure 10:
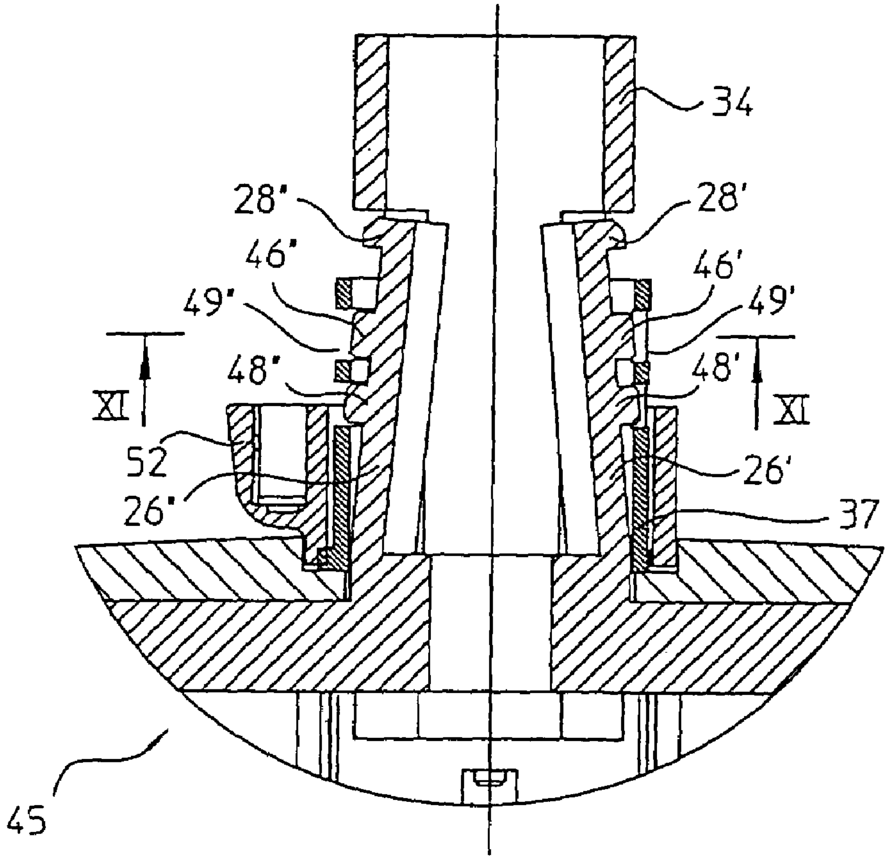
FIG. 10 lower part of the casing with discarding transmitter in the snapped position and unlocked locking hook in a vertical partial section.
Figure 12:
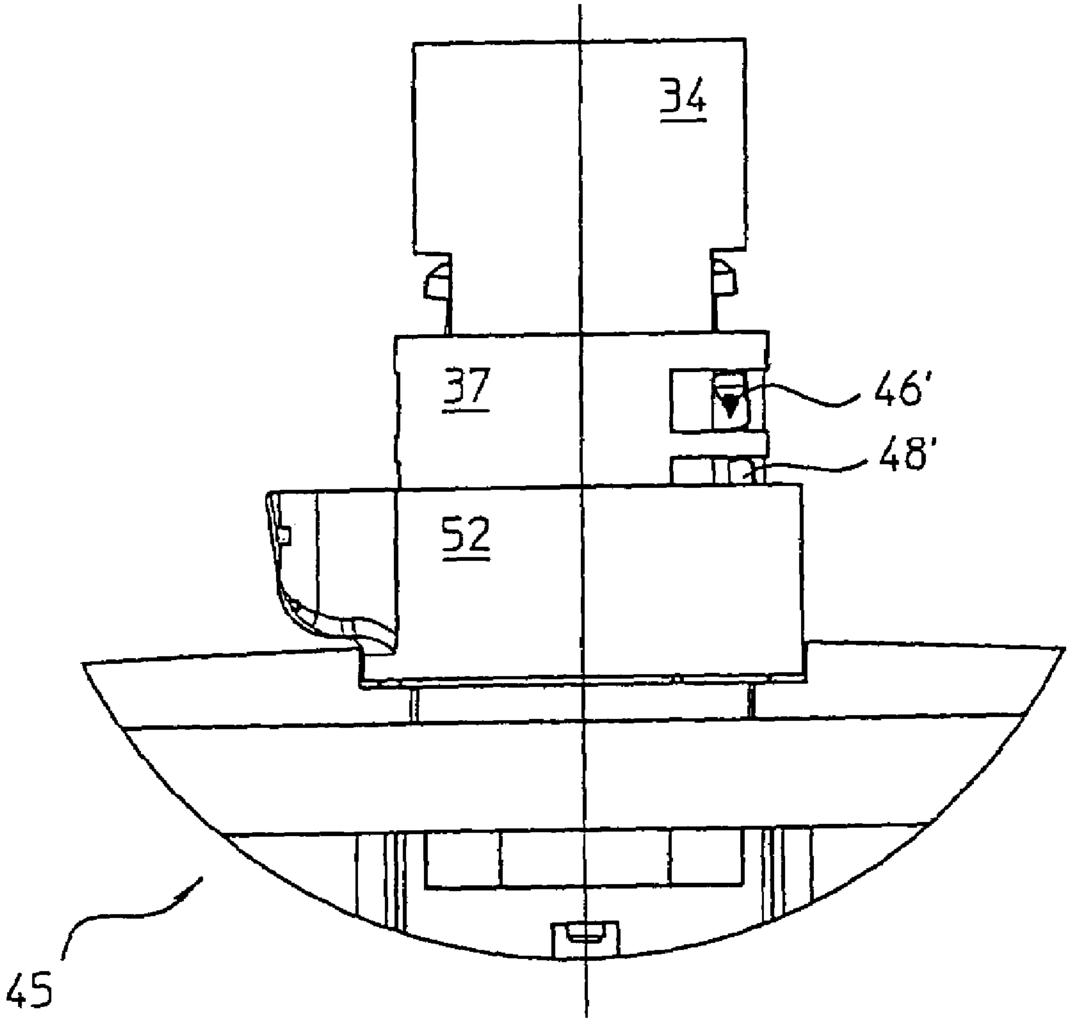
FIG. 12 lower part of the casing with discarding transmitter at unlocked locking hook in a partial view.
Figure 13:
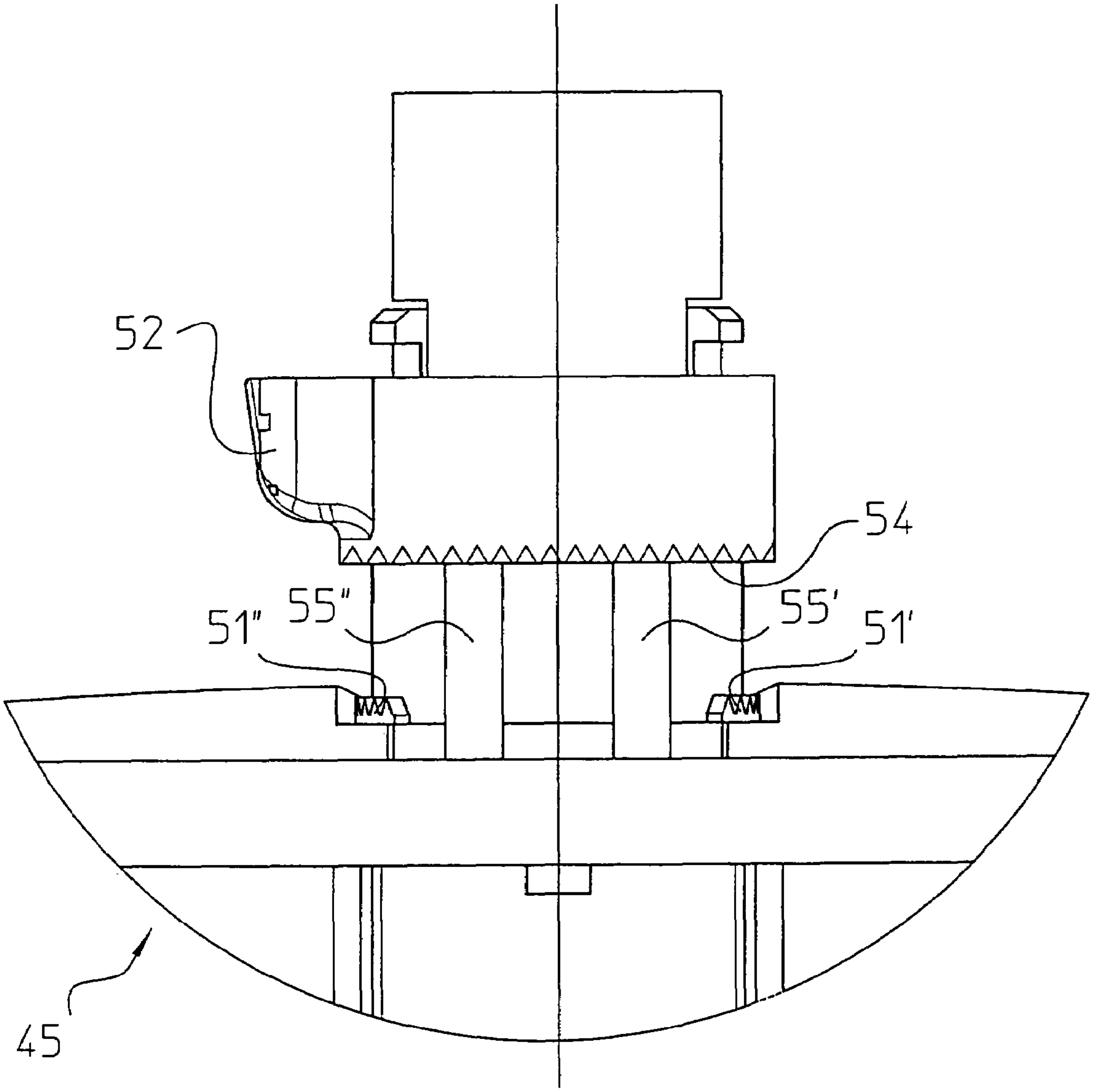
FIG. 13 the same lower part of the casing with discarding transmitter wherein the axial toothings are out of engagement, in a full view.

In co-operation with the ring grooves 50', 50", the stops 48', 48" limit the turnability of the lock release ring 37 on the spigot 25, such that the projections 46', 46" can be brought from the position shown in FIG. 7, in which they engage completely into the receivers 49', 49", into that position which is shown in FIG. 10, in which they sit closely on the inside perimeter of the lock release ring 37, just alongside the receivers 49', 49". When the lock release ring 37 is turned from the position shown in FIG. 7 into the position shown in FIG. 10, the wedge planes 47', 47" slip over the edges of the receivers 49', 49", so that the snap hooks 26', 26" are gradually displaced towards the spigot axis.

On its outer perimeter, the lock release ring 37 has each one toothing 51', 51", axially directed towards the upside, at regions diametrically facing each other.

In addition, a discarding transmitter 52 is axially movable guided on the outside of the spigot 25. The discarding transmitter 52 has a plug-in receiver 53, directed parallel to the spigot 53, into which the plug-in end 44 of the discarding rod 41 can be pressed in. At the bottom, the discarding transmitter 52 has a downside directed circulating axial toothing 54, which is in engagement with the toothing 51', 51" when the discarding transmitter 52 is thrusted towards the downside.

Via discarding bridges 55', 55", arranged on one side of the lower part of the casing 45, the discarding transmitter 52 is connected with a discarding plate, which is assigned to lugs for putting up pipette points. The realisation of such discarders for multi-channel pipettes is known to those skilled in the art and is not pointed out in more detail here.

On the axis of the spigot 25, there extends an actuation rod 56, which is connected below the spigot in a broadened region of the casing with a transverse beam 57. The transverse beam 57 is in turn connected with not shown plungers of several parallel displacement equipments, which are communicatingly connected with the lugs for putting up the pipette points. Even these realisations of multi-channel pipettes, not shown in more detail, are known to those skilled in the art.

On the top, the actuation rod 56 has a pan 19. A plunger return spring 20 charges the pan 19 such that the same is pressed upward against the flange 35.

In order to connect the upper part of the casing 1 and the lower part of the casing 45, the spigot 25 is inserted into the spigot receiver 10, until the claws 28, 28" snap into the claw receiver 13. The pressure spring equipment 7 keeps the claws 28', 28" in close fit on the bottom wall of the claw receiver 13 with their downsides.

In addition, when mounting the spigot 25, the drive element 3 comes into close fit on the plate 19. As a consequence, dosing processes can be undertaken by actuating the drive equipment 2.

The plug-in end 44 of the discarding rod 41 is pressed into the plug-in receiver 53 of the discarding transmitter 52. When the spigot 25 is inserted into the spigot receiver 10, it penetrates into the discarding transmitter 52. In this, the discarding transmitter 52 contacts the discarder bridges 55', 55", which sit closely to the discarding transmitter 52 under spring pre-tension. This condition is reached when the spigot 25 is snapped in the plug-in receiver 53. As a consequence, pipette points put on the lugs can be discarded by actuating the discarding button 42.

It is possible to bring the lower part of the casing 45 into an arbitrary turning position with respect to the upper part of the casing 1.

In order to dismount, the discarding button 42 is actuated, so that the axial toothings 51', 51" engage into the axial toothing 54. Through this, the lock release ring 37 is kept in its turning position. Thereafter, turning out the projections 46', 46" from the receivers 49', 49" can be attained by swinging the lower part of the casing 45. Through this, the claws 28', 28" are lifted out of the claw receiver 13 and the pressure spring equipment 7 pushes the lower part of the casing 45 out of the upper part of the casing 1.

It may be drawn on the lower part of the casing 45 to support this.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A pipetting device comprising an upper part of a casing (1); a drive equipment (2) arranged in the upper part of the casing (1) with a movable drive element (3); a spigot receiver (10) arranged in the upper part of the casing (1); at least one claw receiver (13) inside the spigot receiver (10); a lower part of the casing (14); at least one displacement equipment (15) arranged in the lower part of the casing (14) with a displacement chamber (16); at least one seat (21) for detachably holding a pipette point arranged on the lower part of the casing (14 45) and being connected with the displacement chamber (16) via a channel (22); a spigot (25) arranged on the lower part of the casing (14, 45), to be inserted into the spigot receiver (10); at least one snap hook (26', 26") arranged on the spigot (25) with a claw (28', 28") for engaging into the claw receiver (13) when the spigot (25) is inserted into the spigot receiver (10); and a springy shaft (27', 27") which is deflectable transversely to the axis of the spigot (25) in order to lift off the claw (28, 28") out of the claw receiver (13); a lock release ring (37) movable on the spigot; a wedge gear (29', 29", 46', 46", 37) on the springy shaft (27', 27") and a lock release ring (37) effecting deflection of the snap hook (26', 26") towards the axis upon displacement of the lock release ring (37) in one direction and away from the axis upon displacement of the lock release ring (37) in the direction opposite thereto; and a coupling equipment (19) for coupling the drive element (3) and the displacement equipment (15) when the spigot (25) is inserted into the spigot receiver (10).

2. The pipetting device according to claim 1, wherein a pressure spring equipment (7) is assigned to the spigot receiver (10) in the upper part of the casing (1), and wherein said pressure spring equipment (7) is configured to press against the spigot (25) in a direction opposite to the insertion direction the spigot (25) upon insertion of the spigot (25) into the spigot receiver (10).

3. The pipetting device according to claim 1, wherein the spigot (25) has a sleeve portion (34) positioned before the snap hook (26', 26") in the insertion direction, and at least one connection bridge (33', 33") arranged alongside the snap hook (26', 26"), and wherein the snap hook (26', 26") and the connection bridge (33', 33") are connected with a base portion (24), sleeve portion (34), connection bridge (33', 33") and snap hook (26', 26") form a hollow cylindrical spigot (25), from which the claw (28', 28") projects somewhat towards the outside when the spigot (25) is not inserted into the spigot receiver (10).

4. The pipetting device according to claim 1, wherein the snap hook (26, 26") is oriented essentially parallel to the axis of the spigot (25) in the not deflected state.

5. The pipetting device according to claim 1, wherein the at least one snap hook is comprised of several snap hooks (26', 26"), distributed symmetrically around the perimeter of the spigot (25).

6. The pipetting device according to claim 1, wherein the claw (28', 28") has a feather edge (31) at that end which precedes when inserting into the spigot receiver (10), and/or wherein the spigot receiver (10) has an enlargement (12) directed towards the outside.

7. The pipetting device according to claim 1, wherein the wedge gear (29', 29"; 37) has on the shaft (27, 27") a projection (29', 29") projecting towards the outside, a wedge plane (30', 30") on the projection (29', 29"), and/or a wedge plane on the inside perimeter of the locking ring (37).

8. The pipetting device according to claim 1, wherein the wedge plane (30', 30") is directed in the direction of the spigot (25) and the lock release ring (37) is axially movable on the spigot (25).

9. The pipetting device according to claim 1, wherein the spigot (25) has axial stops (38, 39), between which the lock release ring (37) is movable.

10. The pipetting device according to claim 7, wherein the wedge plane (30', 30") is directed in the perimeter direction of the spigot (25) and the lock release ring (37) has at least one receiver (49', 49"), into which the projection (46', 46") is turnable in.

11. The pipetting device according to claim 10, wherein the springy shaft (27', 27") has a stop (48', 48") projecting towards the outside, and the lock release ring (37) has a receiver groove (50', 50") for the stop (48', 48"), the receiver groove (50', 50") has a limited extension in the perimeter direction of the lock release ring (37), which permits turning the lock release ring (37) from that turning position in which the projection (46', 46") engages into the receiver (49', 49") into a turning position in which the projection (49', 49") sits closely on the inside perimeter of the lock release ring (37) besides the receiver (49, 49").

12. The pipetting device according to claim 1, wherein the lock release ring (37) has an axially directed toothing (51', 51") on its perimeter, and the upper part of the casing (1) has a discarding equipment (41 to 44), which has an additional toothing (54) on an element (52) which is axially movable with respect to the spigot receiver (10), and is out of engagement with the toothing (51', 51") when the discarding equipment (41 to 44) is not actuated, and which can be brought into engagement with the toothing upon actuation of the discarding equipment (41 to 44).

13. The pipetting device according to claim 12, wherein the additional axial toothing (54) is arranged on the lower side of a discarding transmitter (52), being connected with a discarding rod (41) guided in the upper part of the casing (1), and which is connected with a discarder for pipette points which is guided on the lower part of the casing (45).

14. The pipetting device according to claim 1, which is a one-channel pipette.

15. The pipetting device according to claim 1, which is a multi-channel pipette.

* * * * *